United States Patent
Hsu et al.

(10) Patent No.: US 9,983,870 B2
(45) Date of Patent: May 29, 2018

(54) AUTOMATED GENERATION AND IDENTIFICATION OF SCREENSHOTS FOR TRANSLATION REFERENCE

(71) Applicant: International Business Machines Corporation, Armonk, NY (US)

(72) Inventors: Yu-Ning Hsu, Taipei (TW); I-Hsiang Liao, Taipei (TW); Chih-Yuan Lin, New Taipei (TW); Cheng-Yu Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 15/193,574

(22) Filed: Jun. 27, 2016

(65) Prior Publication Data
US 2017/0371652 A1    Dec. 28, 2017

(51) Int. Cl.
| G06F 9/44 | (2018.01) |
| H04L 29/06 | (2006.01) |
| G06F 17/22 | (2006.01) |
| G06K 9/62 | (2006.01) |
| G06F 3/0484 | (2013.01) |

(Continued)

(52) U.S. Cl.
CPC ............ G06F 8/76 (2013.01); G06F 3/0484 (2013.01); G06F 11/3664 (2013.01); G06F 17/2211 (2013.01); G06F 17/28 (2013.01); G06K 9/6202 (2013.01); G06K 9/6215 (2013.01); H04L 69/16 (2013.01); G06F 9/4448 (2013.01)

(58) Field of Classification Search
CPC .................................................... G06F 9/4448
See application file for complete search history.

(56) References Cited

U.S. PATENT DOCUMENTS

| 7,447,624 B2 | 11/2008 | Fuhrmann | |
| 8,671,389 B1 * | 3/2014 | Buryak | G06F 9/4448 717/108 |

(Continued)

FOREIGN PATENT DOCUMENTS

| CN | 101620680 A | 1/2010 |
| CN | 102737241 A | 10/2012 |
| CN | 105426479 A * | 3/2016 |

OTHER PUBLICATIONS

Hedley, http://unicodelookup.com/.*

(Continued)

*Primary Examiner* — Forrest F Tzeng
(74) *Attorney, Agent, or Firm* — Brown & Michaels, PC; David Woycechowsky (57) ABSTRACT

Software translation quality and efficiency are improved by providing user interface (UI) context for translators. Unicode symbols are used to uniquely tag user-visible strings from the source code and into resource files. Those strings include titles, product names, error messages, strings in images and any other text that may be present on the user interface. Once the 'pseudo' resource files are integrated into a build, automation is run to gather screenshots of the application. Image recognition is then used to link screenshots of the UI in which a resource file string appears, such that screenshots will be brought forward and displayed to the translator when working on translating the user-visible strings of the software being localized.

19 Claims, 4 Drawing Sheets

(51) Int. Cl.
*G06F 11/36* (2006.01)
*G06F 17/28* (2006.01)

(56) References Cited

U.S. PATENT DOCUMENTS

| | | | |
|---|---|---|---|
| 2003/0126559 A1* | 7/2003 | Fuhrmann | G06F 9/4448 |
| | | | 715/229 |
| 2003/0200078 A1 | 10/2003 | Luo et al. | |
| 2007/0150500 A1* | 6/2007 | Kawada | G06Q 10/10 |
| 2012/0106790 A1* | 5/2012 | Sultana | G06K 9/00228 |
| | | | 382/103 |
| 2014/0359495 A1* | 12/2014 | Bartley | G06F 8/40 |
| | | | 715/762 |
| 2015/0100301 A1 | 4/2015 | Phadke | |
| 2015/0310306 A1* | 10/2015 | Song | G06K 9/46 |
| | | | 382/159 |
| 2016/0048506 A1 | 2/2016 | Levi et al. | |
| 2017/0017643 A1* | 1/2017 | Bray | G06F 17/2845 |
| 2017/0017648 A1* | 1/2017 | Pearlman | G06K 9/46 |

OTHER PUBLICATIONS http://www.numberconverter.net/get-math/positional-notation-converter/from-decimal-to-quaternary/.*
Kovacs, "ScreenMatch: Providing Context to Software Translators by Displaying Screenshots," CHI 2012, ACM.*
Kovacs, G. "ScreenMatch: Providing Context to Software Translators by Displaying Screenshots", CHI 2012, May 5-10, 2012, Austin, TX, USA.

* cited by examiner

AUTOMATED GENERATION AND IDENTIFICATION OF SCREENSHOTS FOR TRANSLATION REFERENCE

BACKGROUND

The present invention relates to translation of items in programs, and more specifically to automated generation and identification of screenshots for translation reference of items in programs.

During software localization, a portion of the software may be processed for adapting a software product to the linguistic, cultural and technical requirements of a target market. Translators are often given to-be-translated material but are not given corresponding context information. Applications (especially those originally written for the English market) are very often not ready for the translation: sentences are broken into separate strings put together by code instructions, strings are reused in a different context (for example fax as a noun and fax as a verb) and application functional content is not separated from the code (for example error messages are often located as string constants or variables in the code).

Currently, user-visible strings such as labels, messages, contextual help, etc. are extracted into resource bundles, and these resource bundles can be delivered to translators to perform translation separately and in parallel to the development of product functions in each component. However, without the translators seeing the actual product graphical user interface (GUI) and the context in the panel in which user-visible strings are referring to, the translated strings might not perfectly represent the original meaning, or can cause confusion for the end users. To improve the translation quality, translators perform another check for all the translated strings in the panels once the function of the software is fully implemented. As a result, the product delivery time is dependent on post translation verification by the translators.

SUMMARY

According to one embodiment of the present invention, a method of providing context for translation of software during software localization to a user is disclosed. The method comprising the steps of: a computer tagging each user-visible string of source code with a unique number; the computer converting the unique number to a number represented by a numeral system selected from the group consisting of: a binary numeral system, a quaternary numeral system, an octal numeral system, and a hexadecimal numeral system; the computer replacing the numeral system representing the unique number with Unicode symbols to create pseudo resource files with Unicode symbol sequences; the computer integrating the pseudo resource files into a build to create a pseudo build; the computer initiating a graphical user interface testing tool to capture user interface screenshots based on the pseudo build; and the computer utilizing image recognition to match Unicode symbol sequences with the pseudo resource files to link the captured user interface screenshots with the pseudo resource files, such that when the user views the user interface screenshots, a context information panel displaying the pseudo resource files is displayed to the user.

According to another embodiment of the present invention, a computer program product for providing context for translation of software during software localization to a user is disclosed. The computer program product comprises a computer comprising at least one processor, one or more memories, one or more computer readable storage media, the computer program product comprising a computer readable storage medium having program instructions embodied therewith. The program instructions executable by the computer to perform a method comprising: tagging, by the computer, each user-visible string of source code with a unique number; converting, by the computer, the unique number to a number represented by a numeral system selected from the group consisting of: a binary numeral system, a quaternary numeral system, an octal numeral system, and a hexadecimal numeral system; replacing, by the computer, the numeral system representing the unique number with Unicode symbols to create pseudo resource files with Unicode symbol sequences; integrating, by the computer, the pseudo resource files into a build to create a pseudo build; initiating, by the computer, a graphical user interface testing tool to capture user interface screenshots based on the pseudo build; and utilizing, by the computer, image recognition to match Unicode symbol sequences with the pseudo resource files to link the captured user interface screenshots with the pseudo resource files, such that when the user views the user interface screenshots, a context information panel displaying the pseudo resource files is displayed to the user.

According to another embodiment of the present invention, a computer system for providing context for translation of software during software localization to a user is disclosed. The computer system comprising a computer comprising at least one processor, one or more memories, one or more computer readable storage media having program instructions executable by the computer to perform the program instructions. The program instructions comprising: tagging, by the computer, each user-visible string of source code with a unique number; converting, by the computer, the unique number to a number represented by a numeral system selected from the group consisting of: a binary numeral system, a quaternary numeral system, an octal numeral system, and a hexadecimal numeral system; replacing, by the computer, the numeral system representing the unique number with Unicode symbols to create pseudo resource files with Unicode symbol sequences; integrating, by the computer, the pseudo resource files into a build to create a pseudo build; initiating, by the computer, a graphical user interface testing tool to capture user interface screenshots based on the pseudo build; and utilizing, by the computer, image recognition to match Unicode symbol sequences with the pseudo resource files to link the captured user interface screenshots with the pseudo resource files, such that when the user views the user interface screenshots, a context information panel displaying the pseudo resource files is displayed to the user.

DETAILED DESCRIPTION

In an embodiment of the present invention, software translation quality and efficiency are improved by providing user interface (UI) context for translators. Unicode symbols are used to uniquely tag user-visible strings from the source code and into resource files. Those strings include titles, product names, error messages, strings in images and any other text the user might see. Once the 'pseudo' resource files are integrated into a build, automation is run to gather screenshots of the application. Image recognition is then used to link screenshots of the UI in which a resource file string appears, such that screenshots will be brought forward and displayed to the translator when working on translating the user-visible strings of the software. By providing context in which the source text appears to the translator, translation quality and efficiency are improved.

Figure 1:
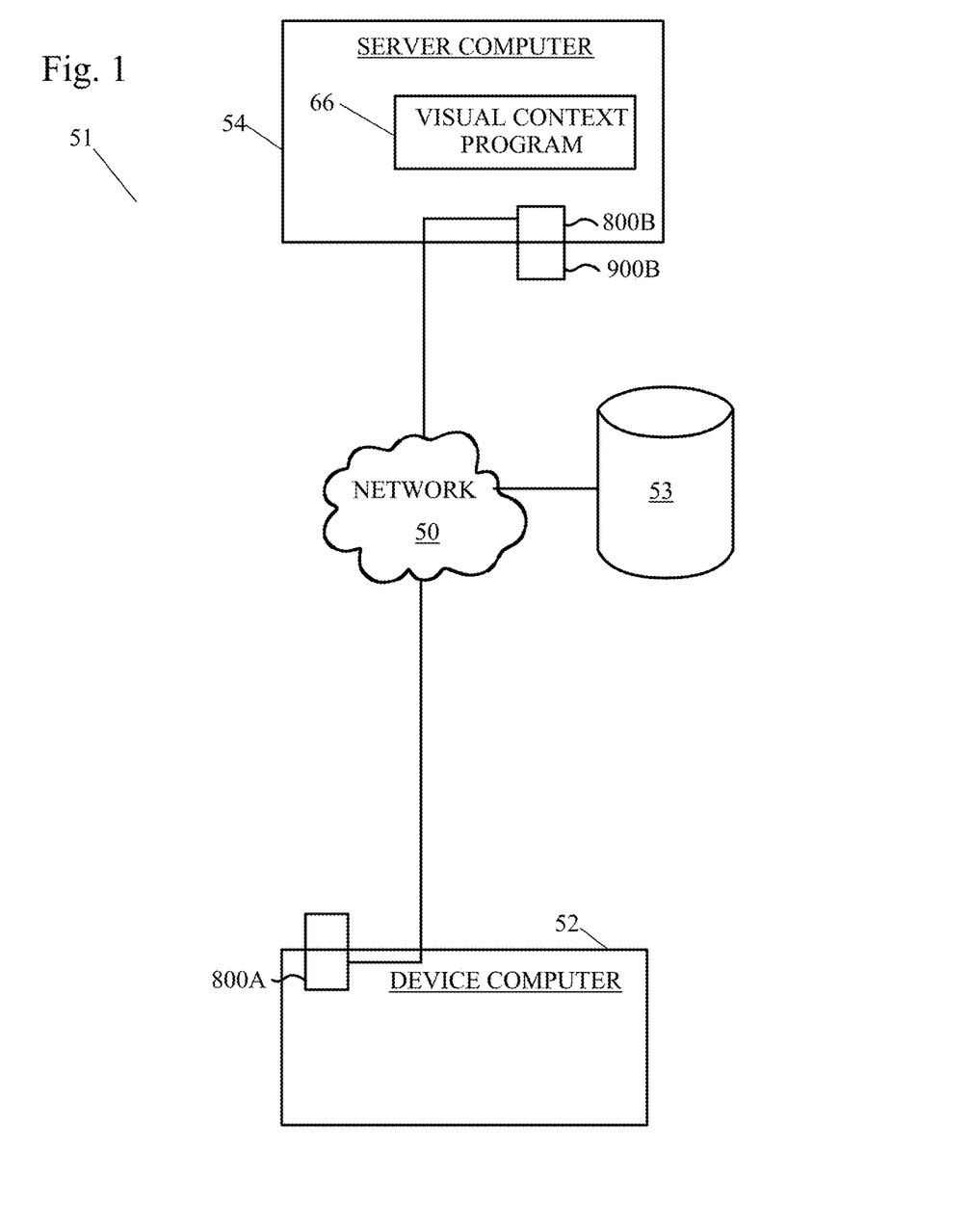
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may contain an interface, which may accept commands and data entry from a user, for example translation of portions of the software. The interface can be, for example, a command line interface, a graphical user interface (GUI), a natural user interface (NUI) or a touch user interface (TUI). The device computer 52 includes a set of internal components 800*a* and a set of external components 900*a*, further illustrated in FIG. 5.

Figure 5:
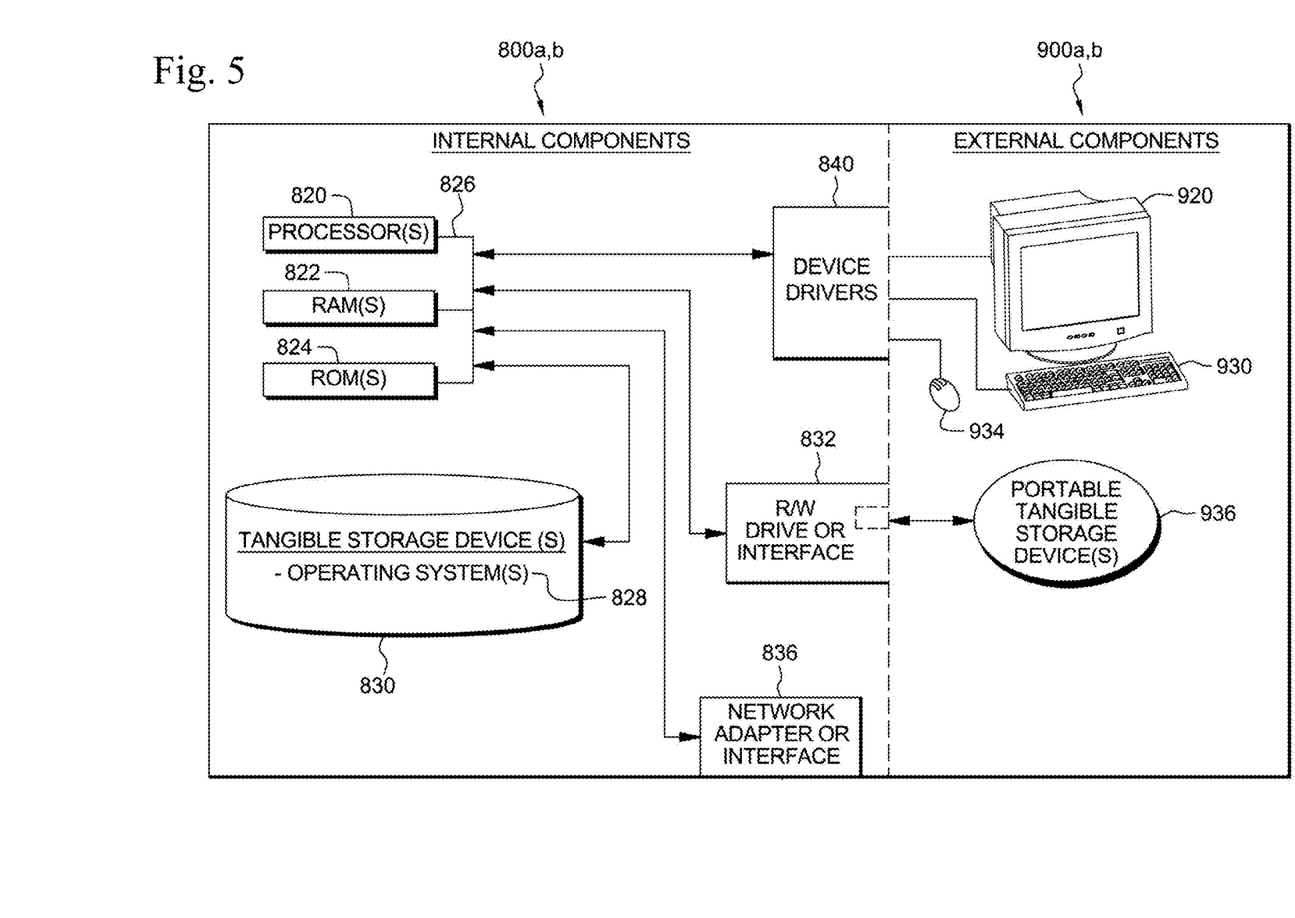
FIG. 5 shows internal and external components of a device computer and a server computer in which illustrative embodiments may be implemented.

Server computer 54 includes a set of internal components 800*b* and a set of external components 900*b* illustrated in FIG. 5. In the depicted example, server computer 54 provides information, such as boot files, operating system images, applications, and screenshots of software linked to resource files providing visual context for translation to the device computer 52. The server computer 54 may contain an interface which may accept commands and data entry from a user, for example monitoring rules. The interface can be, for example, a command line interface, a graphical user interface (GUI), a natural user interface (NUI) or a touch user interface (TUI). The server computer preferably contains a visual context program 66. Server computer 54 can compute the information locally or extract the information from other computers on network 50. While not shown, the visual context program 66 may also be present on the device computer 52.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 4:
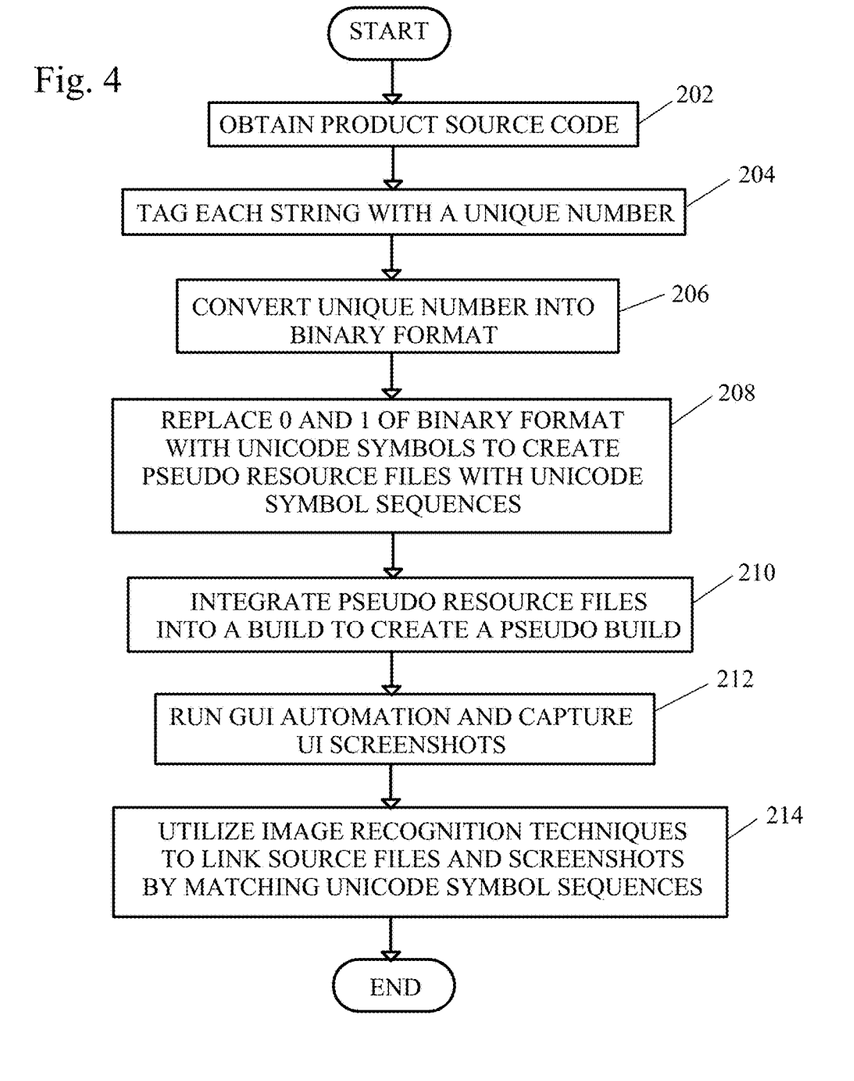
FIG. 4 shows a flow diagram of a method of automated generation and identification of screenshots for translation reference.

FIG. 4 shows a flow diagram of a method of automated generation and identification of screenshots for translation reference.

In a first step, the software product source code is obtained (step 202), for example by the visual context program 66.

Each user-visible string of the source code is tagged with a unique number (step 204) and the unique number is converted into a numeral system, for example a base-2 numeral system representing a binary format (step 206), for example by the visual context program 66.

For example,

Original String: UsernameLabel=User Name

Number the String: UsernameLabel=34 User Name

Convert the Number to Binary: UsernameLabel=0010 0010 User Name

The source file string volume may determine how long the symbol sequence is. If the symbol sequence is too long, for example the user interface cannot completely display the symbol sequence, the unique number may be converted into a base-4 number of a quaternary numeral system, a base-8 number of an octal numeral system, or a base-16 number of a hexadecimal numeral system. It should be noted that a base-4, base-8 or base-16 number may correspond to binary.

Next, the binary format is replaced with Unicode symbols to create pseudo resource files (step 208), for example by the visual context program 66. For example, the 0 may be replaced with ○ (U+25CB) and replace 1 with ● (U+25CF) resulting in a pseudo resource file which includes a Unicode prefix:

○○●○○○●○User Name

The Unicode symbols may be further refined where ○=00, ●=01, ■=10 (U+25A0), and □=11 (U+25A1), such that the above Unicode symbol sequence representing User Name may be refined to:

○■○■User Name

Unicode symbols are used since they are highly recognizable, even under low resolution conditions, simple, and widely supported within the basic multilingual plane (BMP), by most platforms and fonts. Furthermore, Unicode symbols are rarely seen on product UI's, which would avoid recognizing a portion of the product that does not provide context for the translator. It should be noted that Unicode symbol such as ○ (U+25CB) and ● (U+25CF) are used as examples only and does not limit the Unicode symbols or characters that may be used with the present invention.

The pseudo resource files are integrated into a build to obtain a pseudo build of the software based on the pseudo resource files (step 210), for example by the visual context program 66. The pseudo resource files are created by a building tool that can automatically add the Unicode characters/symbols into the existing strings, for example, if the original strings in the resource file are: Hello World !!, the building tool can add characters and modify the strings into [A B C & * ~~ Hello World !!~~ D E F $ #], and generate the pseudo resource files accordingly.

The visual context program 66 initiates a graphical user interface (GUI) testing tool to automate the testing process of the software based on the pseudo build with graphical user interfaces and captures the user interface (UI) screenshots (step 212). The screenshots preferably include user visible pseudo strings. The GUI testing tool may be, but is not limited to: Rational Functional Tester of IBM, Selenium, open-source software under Apache 2.0, QF-Test of Quality First Software, Oracle Application Testing Suite from Oracle Corporation and others.

Figure 2:
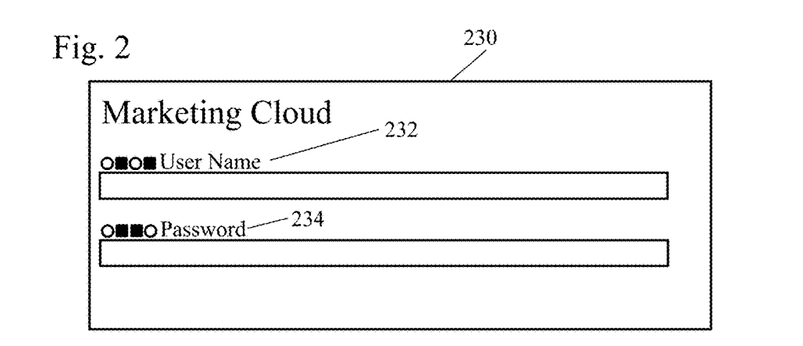
FIG. 2 shows an example of a captured user interface (UI) screenshot.

FIG. 2 shows an example of a captured UI screenshot. Within the screenshot 230, the user-visible strings 232, 234 such as User Name and Password each contain Unicode symbol sequences based on the binary code associated with the unique number assigned to the user-visible strings and are present in the screenshot. As shown in FIG. 2, the user-visible strings of: User Name has a Unicode symbol sequence of ○■○■ and Password has a Unicode symbol sequence of ○■■○.

Next, image recognition techniques link the resource files and screenshots by matching Unicode sequences (step 214) and the method ends. Examples of image recognition techniques that may be used include, but are not limited to template matching and object recognition. For a template image that has strong features, a feature-based approach may be considered, such as scale-invariant feature transform (SIFT) or speeded up robust features (SURF) which are robust to affine transformations (changes in scale, rotation, shear, and position) and changes in illumination.

Figure 3:
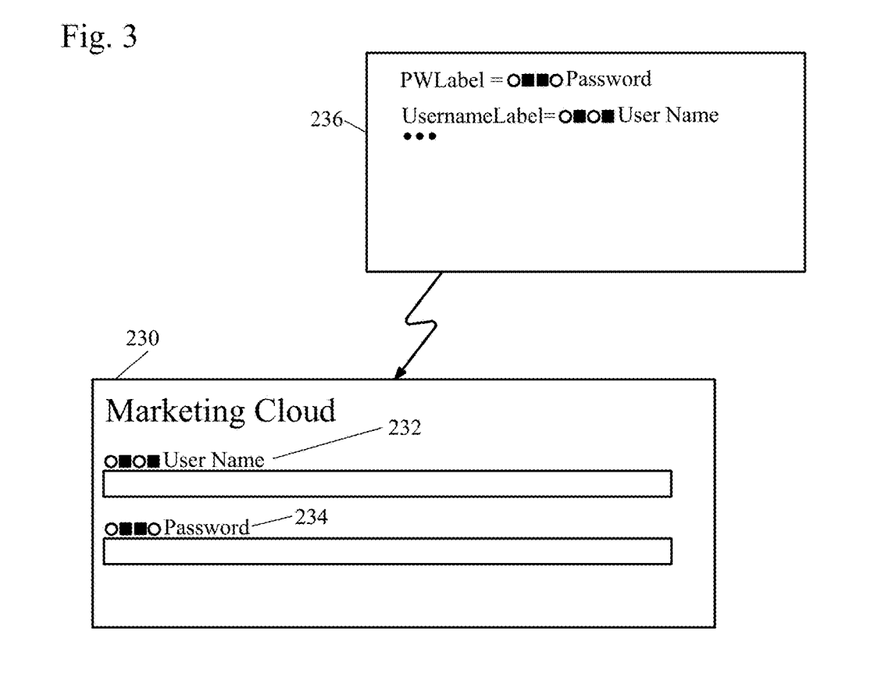
FIG. 3 shows an example of linked source files and screenshots with screenshots popping up as the translator works on the translations.

By linking resource files and screenshots, UI screenshots may appear to provide context to the translator when translating the UI as shown in FIG. 3. For example, when a translator is translating screenshot 230, a context information panel 236 may appear, providing additional information regarding the wording of the user-visible strings 232, 234.

FIG. 5 illustrates internal and external components of a device computer 52 and server computer 54 in which illustrative embodiments may be implemented. In FIG. 5, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the visual context program 66 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Visual context program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Visual context program 66 can be downloaded to the device computer 52 and server computer 54 from an external computer via a network (for example, the Internet, a local area network or other, wide area network) and network adapter or interface 836. From the network adapter or interface 836, visual context program 66 is loaded into hard drive 830. Visual context program 66 can be downloaded to the server computer 54 from an external computer via a network (for example, the Internet, a local area network or other, wide area network) and network adapter or interface 836. From the network adapter or interface 836, visual context program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Visual context program 66 can be written in various programming languages including low-level, high-level, object-oriented or non object-oriented languages. Alternatively, the functions of visual context program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing context for translation of software during software localization to a user comprising the steps of:
    a computer tagging each user-visible string of source code with a unique number;
    the computer converting the unique number to a number represented by a numeral system selected from the group consisting of: a binary numeral system, a quaternary numeral system, an octal numeral system, and a hexadecimal numeral system;
    the computer replacing the numeral system representing the unique number with Unicode symbols to create pseudo resource files with Unicode symbol sequences;
    the computer integrating the pseudo resource files into a build to create a pseudo build;
    the computer initiating a graphical user interface testing tool to capture user interface screenshots based on the pseudo build; and
    the computer utilizing image recognition to match Unicode symbol sequences with the pseudo resource files to link the captured user interface screenshots with the pseudo resource files, such that when the user views the user interface screenshots, a translation context information panel displaying the pseudo resource files is displayed to the user.

2. The method of claim 1, wherein the user is a translator.

3. The method of claim 1, wherein image recognition is a technique selected from the group consisting of: template matching and object recognition.

4. The method of claim 3, wherein template matching and object recognition are determined using a feature-based approach selected from the group consisting of: scale-invariant feature transform and speeded up robust features.

5. The method of claim 1, wherein, if the Unicode symbol sequence exceeds a predetermined length, converting the unique number into a base-4 number of the quaternary numeral system.

6. The method of claim 1, wherein, if the Unicode symbol sequence exceeds a predetermined length, converting the unique number into a base-8 number of the octal numeral system.

7. The method of claim 1, wherein, if the Unicode symbol sequence exceeds a predetermined length, converting the unique number into a base-16 number of the hexadecimal numeral system.

8. A computer program product for providing context for translation of software during software localization to a user, a computer comprising at least one processor, one or more memories, one or more computer readable storage media, the computer program product comprising a computer readable storage medium having program instructions embodied therewith, the program instructions executable by the computer to perform a method comprising:
  tagging, by the computer, each user-visible string of source code with a unique number;
  converting, by the computer, the unique number to a number represented by a numeral system selected from the group consisting of: a binary numeral system, a quaternary numeral system, an octal numeral system, and a hexadecimal numeral system;
  replacing, by the computer, the numeral system representing the unique number with Unicode symbols to create pseudo resource files with Unicode symbol sequences;
  integrating, by the computer, the pseudo resource files into a build to create a pseudo build;
  initiating, by the computer, a graphical user interface testing tool to capture user interface screenshots based on the pseudo build; and
  utilizing, by the computer, image recognition to match Unicode symbol sequences with the pseudo resource files to link the captured user interface screenshots with the pseudo resource files, such that when the user views the user interface screenshots, a translation context information panel displaying the pseudo resource files is displayed to the user.

9. The computer program product of claim 8, wherein image recognition is a technique selected from the group consisting of: template matching and object recognition.

10. The computer program product of claim 9, wherein template matching and object recognition are determined using a feature-based approach selected from the group consisting of: scale-invariant feature transform and speeded up robust features.

11. The computer program product of claim 8, wherein, if the Unicode symbol sequence exceeds a predetermined length, converting the unique number into a base-4 number of the quaternary numeral system.

12. The computer program product of claim 8, wherein, if the Unicode symbol sequence exceeds a predetermined length, converting the unique number into a base-8 number of the octal numeral system.

13. The computer program product of claim 8, wherein, if the Unicode symbol sequence exceeds a predetermined length, converting the unique number into a base-16 number of the hexadecimal numeral system.

14. A computer system for providing context for translation of software during software localization to a user comprising a computer comprising at least one processor, one or more memories, one or more computer readable storage media having program instructions executable by the computer to perform the program instructions comprising:
  tagging, by the computer, each user-visible string of source code with a unique number;
  converting, by the computer, the unique number to a number represented by a numeral system selected from the group consisting of: a binary numeral system, a quaternary numeral system, an octal numeral system, and a hexadecimal numeral system;
  replacing, by the computer, the numeral system representing the unique number with Unicode symbols to create pseudo resource files with Unicode symbol sequences;
  integrating, by the computer, the pseudo resource files into a build to create a pseudo build;
  initiating, by the computer, a graphical user interface testing tool to capture user interface screenshots based on the pseudo build; and
  utilizing, by the computer, image recognition to match Unicode symbol sequences with the pseudo resource files to link the captured user interface screenshots with the pseudo resource files, such that when the user views the user interface screenshots, a translation context information panel displaying the pseudo resource files is displayed to the user.

15. The computer system of claim 14, wherein image recognition is a technique selected from the group consisting of: template matching and object recognition.

16. The computer system of claim 15, wherein template matching and object recognition are determined using a feature-based approach selected from the group consisting of: scale-invariant feature transform and speeded up robust features.

17. The computer system of claim 14, wherein, if the Unicode symbol sequence exceeds a predetermined length, converting the unique number into a base-4 number of the quaternary numeral system.

18. The computer system of claim 14, wherein, if the Unicode symbol sequence exceeds a predetermined length, converting the unique number into a base-8 number of the octal numeral system.

19. The computer system of claim 14, wherein, if the Unicode symbol sequence exceeds a predetermined length, converting the unique number into a base-16 number of the hexadecimal numeral system.

* * * * *